(12) United States Patent
Tang (10) Patent No.: US 7,637,447 B2
(45) Date of Patent: Dec. 29, 2009

(54) DUAL CONDIMENT GRINDER

(75) Inventor: Wing Sum Tang, Kowloon (HK)

(73) Assignee: Samson Bright Industrial Company Limited, Kowloon (HK)

( * ) Notice: Subject to any disclaimer, the term of this patent is extended or adjusted under 35 U.S.C. 154(b) by 125 days.

(21) Appl. No.: 11/850,433

(22) Filed: Sep. 5, 2007

(65) Prior Publication Data

US 2009/0057451 A1    Mar. 5, 2009

(51) Int. Cl.
*A47J 42/04* (2006.01)
(52) U.S. Cl. .................................. 241/169.1
(58) Field of Classification Search ............. 241/169.1, 241/169, 101.2
See application file for complete search history.

(56) References Cited

U.S. PATENT DOCUMENTS

| 4,709,865 A | * | 12/1987 | Bounds ................... 241/169.1 |
| 4,844,352 A | * | 7/1989 | Griffin ..................... 241/101.2 |
| 5,088,652 A | | 2/1992 | Chen |

2002/0130208 A1    9/2002  Pedersen

FOREIGN PATENT DOCUMENTS

| EP | 1 876 787 A1 | 1/2008 |
| EP | 0876787 A1 | 1/2008 |
| GB | 2 183 173 A | 6/1987 |
| WO | WO 00/28870 A2 | 5/2000 |
| WO | WO 00/28870 A3 | 5/2000 |

OTHER PUBLICATIONS

Patents Act 1977: Examination Report under Section 18(3) for United Kingdom Counterpart Application No. GB 0717086.3, 4 pgs. (Dec. 18, 2007).

* cited by examiner

*Primary Examiner*—Mark Rosenbaum
(74) *Attorney, Agent, or Firm*—Blakely, Sokoloff, Taylor & Zafman LLP (57) ABSTRACT

A grinder having two condiment-receiving compartments each with a respective rotary grinding mechanism dispenses from one or other of the compartments depending upon whether a rotary input is turned clockwise or anticlockwise. First and second gear trains transmit torque between the rotary input and each grinding mechanism, with a one-way clutch provided in each gear train and an auxiliary gear allows both grinding mechanisms to rotate in the same sense.

6 Claims, 8 Drawing Sheets

DUAL CONDIMENT GRINDER

TECHNICAL FIELD

The present invention relates to manual or motorised hand-held dual condiment grinders having separate compartments for each condiment each compartment having a respective grinding mechanism at its base, the grinding mechanisms being operable selectively, depending upon the sense in which a rotary input is turned.

BACKGROUND OF THE INVENTION

In the conventional rotary grinding mechanism for a condiment grinder, coaxial inner and outer grinding elements are provided. The outer element is fixedly received in the main body of the grinder, with the inner element received to rotate within the outer element. The opposing grinding faces of the grinding elements are tapered or generally conical grinding faces such that relative axial adjustment between the elements can be used to adjust the fineness of the ground condiment. Although some grinding mechanisms are bi-directional, for efficient grinding uni-directional grinding mechanisms are employed that have grinding faces with teeth, grooves or ribs arranged directionally relative to the axis of rotation (e.g. circumferentially tapered in a right-handed helical pattern) for satisfactory performance in one direction of rotation only.

Dual condiment grinders meet a need for a grinder which can be used to dispense both freshly ground salt and pepper. U.S. Pat. No. 4,709,865 describes a dual condiment grinder of the above-mentioned type having separate compartments for each condiment, each having a respective grinding mechanism at the base of the container, both grinding mechanisms being operable by a single handle. A shaft for rotatably driving each of the grinding mechanisms, extends upwardly through its associated compartment and has a spur gear fixedly attached to the upper end thereof. A pivotally supported gear drive mechanism is provided at the top of the compartments which engages the gear of one of the grinding mechanisms when rotated in one direction and the gear of the other of the grinding mechanisms when rotated in an opposite direction. A drawback with this grinder is that, for best performance, two different directional grinding mechanisms are required. Alternatively, production costs can be reduced with the use of two like bi-directional grinding mechanisms, however this compromises the performance of the grinder. It is an object of the present invention to overcome or substantially ameliorate the above disadvantages or more generally to provide an improved grinder.

DISCLOSURE OF THE INVENTION

According to one aspect of the present invention there is provided a dual condiment grinder comprising:

first and second compartments for containing a separate condiment to be ground, each compartment having a top and bottom end, a first and second uni-directional grinding mechanism, each installed at the bottom of a respective one of the compartments, first and second shafts having bottom ends fixedly attached to each of the grinding mechanisms and top ends respectively extending upwardly through their associated compartments, a rotary input mounted for bidirectional rotation about a driving axis for selective rotation of one of the first and second grinding mechanisms, first and second gear trains for transmitting torque from the rotary input to the first and second shafts respectively, first and second one-way clutch means, each provided in a respective one of the gear trains, whereby rotation of the rotary input in one direction rotates the first grinding mechanism, while the second grinding mechanism is stationary, and rotation of the rotary input in a direction opposite to the one direction rotates the second grinding mechanism while the first grinding mechanism is stationary, both grinding mechanisms rotating in the same sense.

Preferably the grinder further comprises a first gear driven by the rotary input the first gear train comprises second, third and fourth gears and the second gear train comprises fifth, sixth, seventh and eighth gears, wherein:

the second gear is rotationally fast with the first shaft, the third gear is meshed with the second gear, the fourth gear is meshed with the first gear and mounted coaxially with the third gear, the fifth gear is rotationally fast with the second shaft, the sixth and seventh gears are mounted coaxially, the first one-way clutch means transmits torque unidirectionally between a first pair of gears comprising the fourth and third gears and the second one-way clutch means transmits torque unidirectionally between a second pair of gears comprising the sixth and seventh gears and either:

the sixth gear is meshed with the first gear, and the eighth gear is meshed with both the fifth and seventh gears, or the eighth gear is meshed with both the first and sixth gears, and the seventh gear is meshed with the fifth gear.

Optionally, the rotary input may comprise a manually-rotated handle or a drive shaft of a reversible motor.

Preferably the gears are bevel gears. Preferably the first, second, third, fifth, sixth and eighth gears are mounted for rotation about substantially parallel axes.

Preferably each one-way clutch includes first and second members for transmitting torque therebetween, the first member having one of circumferentially spaced teeth and a latching member mounted to engage the teeth and the second member includes the other of circumferentially spaced teeth and a latching member mounted to engage the teeth, and each one-way clutch further includes a spring for urging the latching member into engagement with the teeth.

In one embodiment the circumferentially spaced teeth of each clutch are integral with a first of the gears of each gear pair and a second of the gears of each gear pair includes an axially-extending recess, the latching member and spring are received in the recess such that the latching member is axially moveable with, but rotationally fast with the recess and the spring acts urges the latching member to engage the teeth.

In another embodiment the circumferentially spaced teeth of each clutch are integral with a first of the gears of each gear pair and a second of the gears of each gear pair is integral with the latching member and mounted to slide axially on a shaft, and the spring acts upon the second of the gears to urge the latching member to engage the teeth.

In this manner the invention provides a grinder for selectively dispensing one or the other of two freshly ground condiments in which meshed gear pairs remain in mesh during operation for reliable operation and which may be economically manufactured, in particular allowing two like grinding mechanisms to be used.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Figure 1:
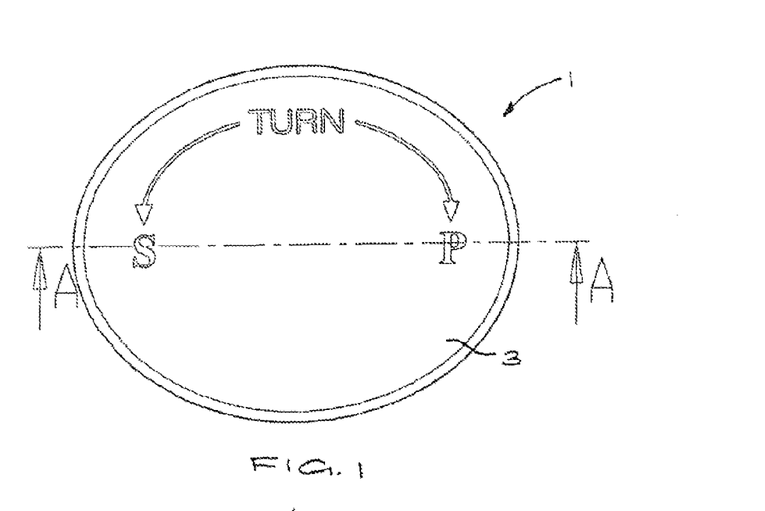
FIG. 1 is a plan view of a first embodiment of a dual condiment grinder of the invention.
Figure 2:
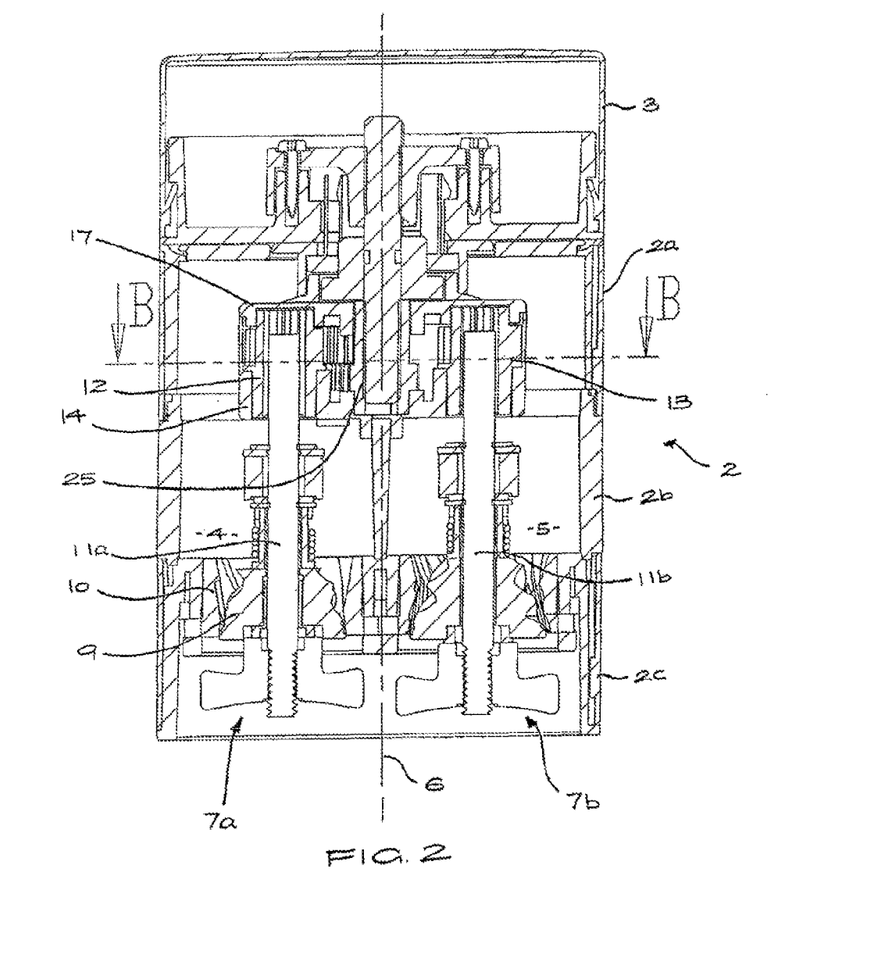
FIG. 2 is a schematic longitudinal section along AA of FIG. 1.
Figure 3:
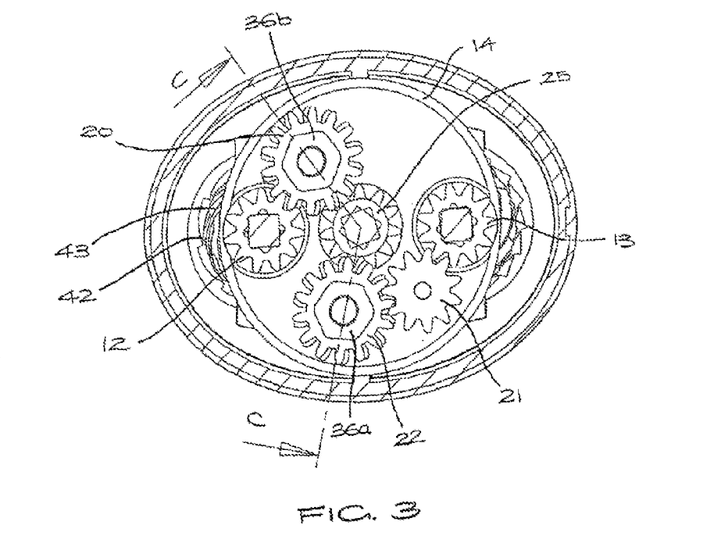
FIG. 3 is the transverse section BB of FIG. 2.

Referring to the drawings, particularly FIGS. 1 and 2, a first embodiment of the dual condiment grinder 1 includes a housing assembly 2 to an upper end of which a rotary input in the form of a handle 3 is mounted. The housing assembly 2 includes housing parts 2a, 2b and 2c. Both the housing assembly 2 and handle 3 have an ovoid cross section. The housing assembly 2 encloses compartments 4 and 5 arranged symmetrically either side of a central longitudinal axis 6 for containing peppercorns and rock salt respectively.

Respective grinding mechanisms 7a, 7b are installed at the bottom of each compartment 4, 5. Each of the grinding mechanisms 7a, 7b includes generally axially-aligned inner and outer grinding elements 9, 10. The inner grinding element 9 is mounted at the lower end of the grinder shafts 11a, 11b that extend upward through the associated compartment 4, 5. Each of the outer grinding elements 10 is fixed in the lower end of housing assembly 2, to extend about a respective inner grinding element 9.

As seen in FIGS. 3-6, the first embodiment of the dual condiment grinder 1 includes a drive assembly 8 held in the housing assembly 2 within an axially aligned cylindrical enclosure 14, which is itself disposed between housing parts 2a and 2b. A disc-shaped closure 17 covers the open end of the enclosure 14 and has a central opening 18 for receiving a drive shaft 19 coaxial with the axis 6 and drivingly fixed to the handle 3. Apertures 15, 16 in the base of enclosure 14 are provided for receiving the shafts 11a, 11b. The enclosure 14 and closure 17 hold first, second, third, fourth, fifth, sixth, seventh and eighth spur gears 25, 12, 20, 26, 13, 27, 22, 21 mounted to rotate on parallel axes. Second and fifth spur gears 12, 13 are rotationally fast with the upper ends of grinder shafts 11a, 11b respectively.

The third gear 20 rotates about third gear axis 20a and is meshed with the second gear 12. The eighth gear 21 is meshed with both the fifth gear 13 and a seventh gear 22 which rotates about seventh gear axis 22a. First and second one-way clutches 23, 24 are provided for rotating the third and seventh gears 20, 22 respectively. A first gear train 46 driven by the first gear 25 comprises second, third and fourth gears 12, 20, 26 and a second gear train 47 also driven by the first gear 25 comprises fifth, sixth seventh and eighth gears 13, 27, 22, 21.

The second and fifth gears 12, 13 and first gear 25 have axially opposing cylindrical journal faces received in recesses in the inner sides of the enclosure 14 and closure 17. The opposing ends of cylindrical shafts 28, 29, 30 are also located in recesses in the inner sides of the enclosure 14 and closure 17. The shaft 28 supports the eighth gear 21, the shaft 29 supports both the seventh gear 22 and the sixth gear 27, and the shaft 30 supports both third gear 20 and the fourth gear 26. The second and fifth gears 12 and 13 include recesses 31a, 31b to receive square-section ends 32 of the grinder shafts 11a, 11b. The first gear 25 is fixed to rotate with the drive shaft 19 about the axis 6 and has a square-section recess 33 to receive a square-section end 34 of the drive shaft 19.

The first one-way clutch 23 provides for one-directional transmission of torque between the fourth and third gears 26, 20, while the second one-way clutch 24 correspondingly provides for one-directional transmission of torque between the sixth and seventh gears 27, 22. Both one-way clutches 23, 24 are of the ratchet type and of like construction, each including first and second members between which torque transmission is connected and disconnected. The first members are circumferentially spaced teeth 35a, 35b, the second member is a latching member 36a, 36b urged by a compression spring 37a, 37b into engagement with the teeth to provide unidirectional torque transmission.

Figure 6:
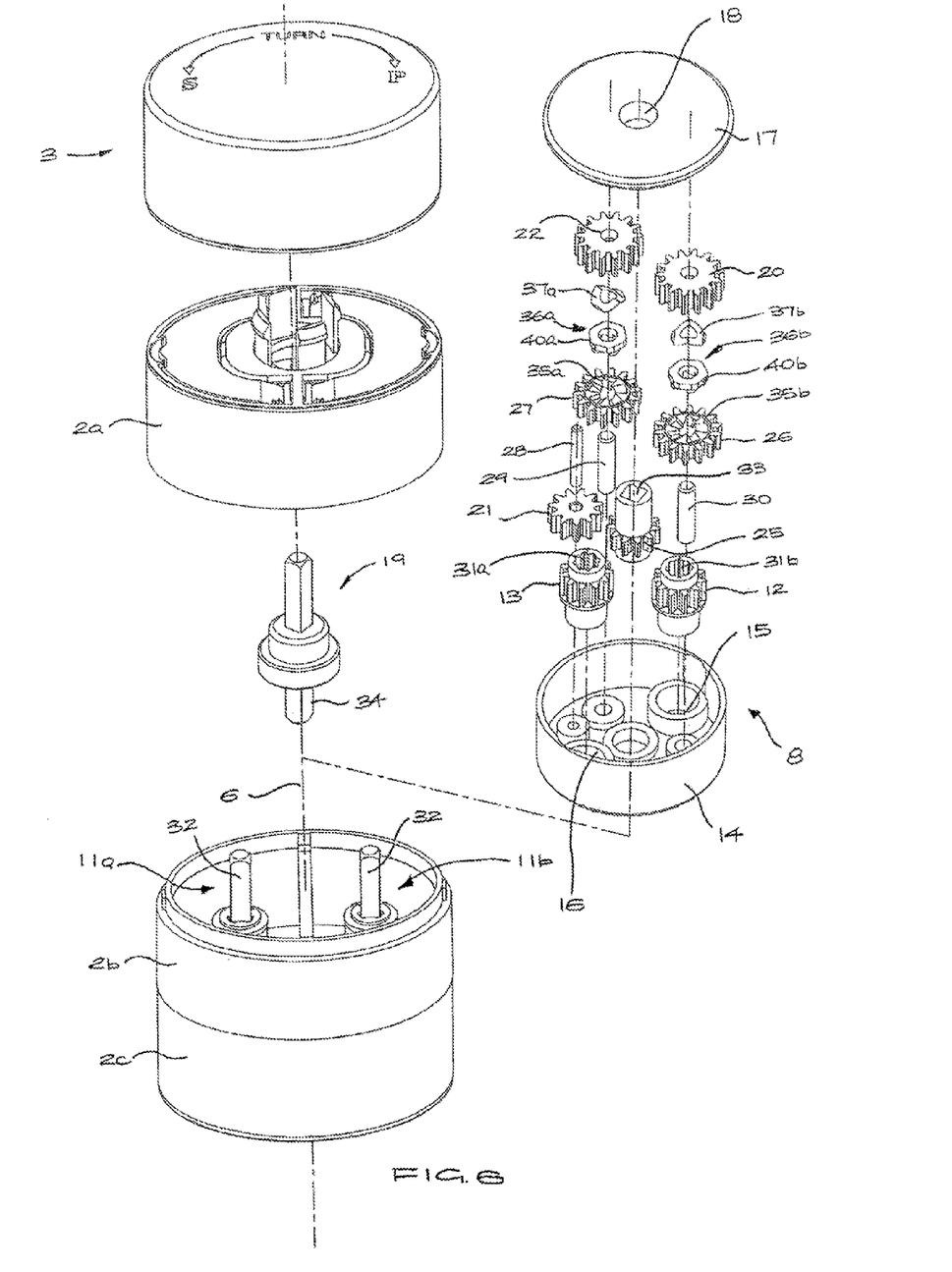
FIG. 6 is an exploded pictorial view of the gear drive assembly of the grinder of FIG. 1.

In the first embodiment illustrated, the fourth and third gears 26, 20 have axially opposing sides 26b, 20b with the teeth 35b formed in the face 26b integrally with the fourth gear 26. An axially-extending opening 39b having a hexagonal cross section opens into the side 20b and receives the spring 37b and the latching member 36b. The latching member 36b a hexagonal head 40b such that it is rotationally fast with the third gear 20 but can move axially in the opening 39b.

Figure 4:
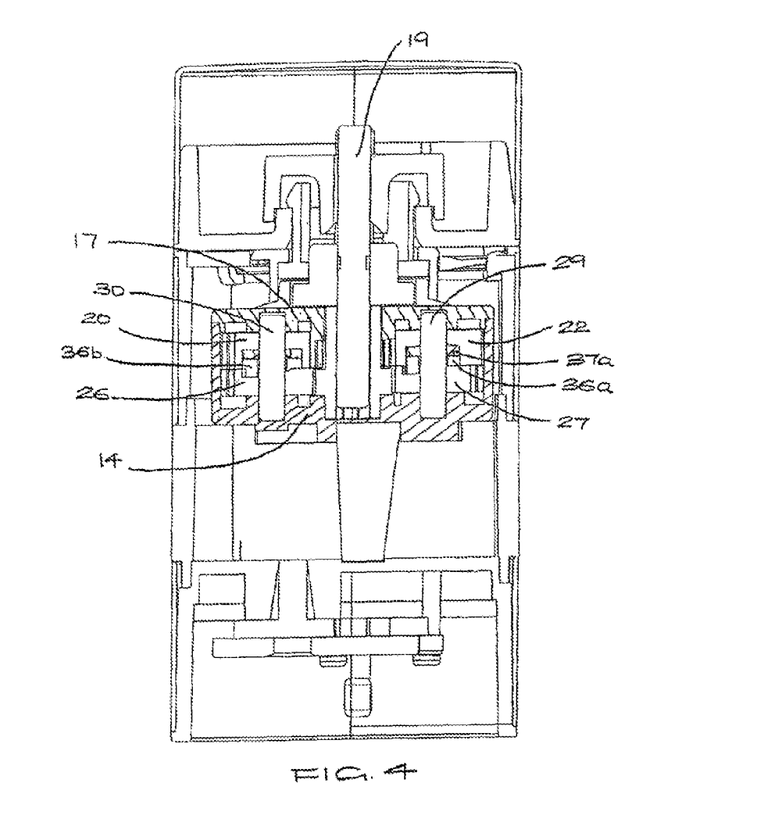
FIG. 4 is a schematic section along CC of FIG. 3.
Figure 5:
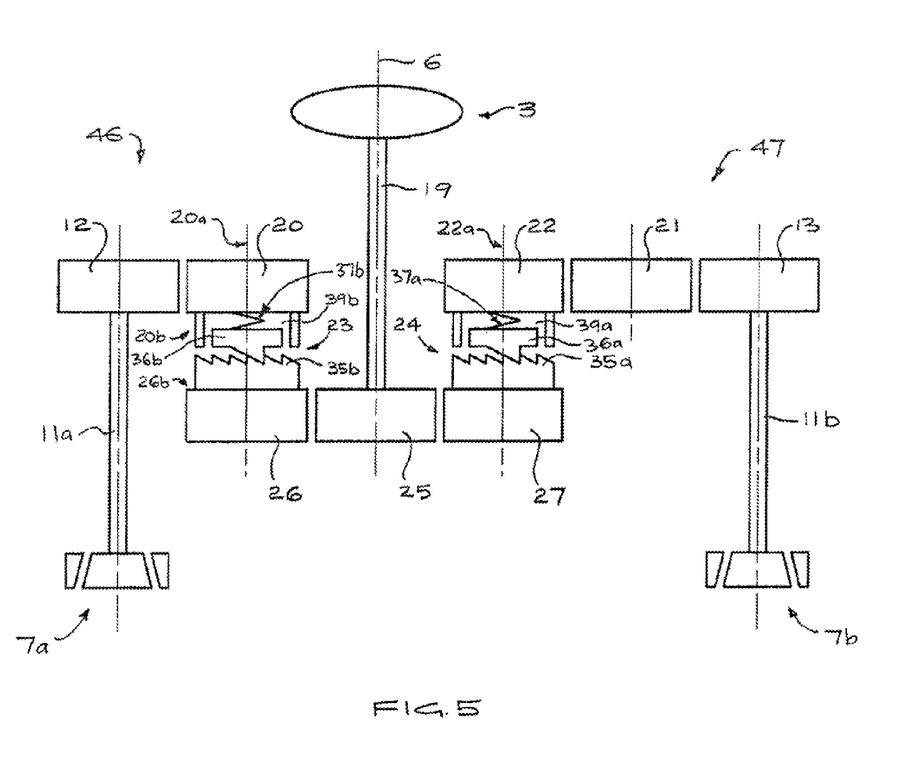
FIG. 5 is a schematic illustration of drive assembly of the grinder of FIG. 1.

Referring to FIG. 4, when the handle 3 is rotated anticlockwise (direction "S") torque is transmitted through the one-way clutch 24 to the grinding mechanism 7b, to grind and dispense salt from the compartment 5. As no torque is transmitted by the one-way clutch 23, the grinding mechanism 7a is stationary.

Upon clockwise rotation (direction "P") of the handle 3, torque is transmitted through the one-way clutch 23 to the grinding mechanism 7a to grind and dispense pepper from the compartment 4 and no torque is transmitted by the one-way clutch 24 to grinding mechanism 7b which is stationary.

Referring to FIGS. 7-11, a second embodiment of the dual condiment grinder 101 differs from the first embodiment in the construction of the drive assembly, and particularly in respect of the construction of the one-way clutches and the position of the eighth gear 21 in the second gear train.

Figure 10:
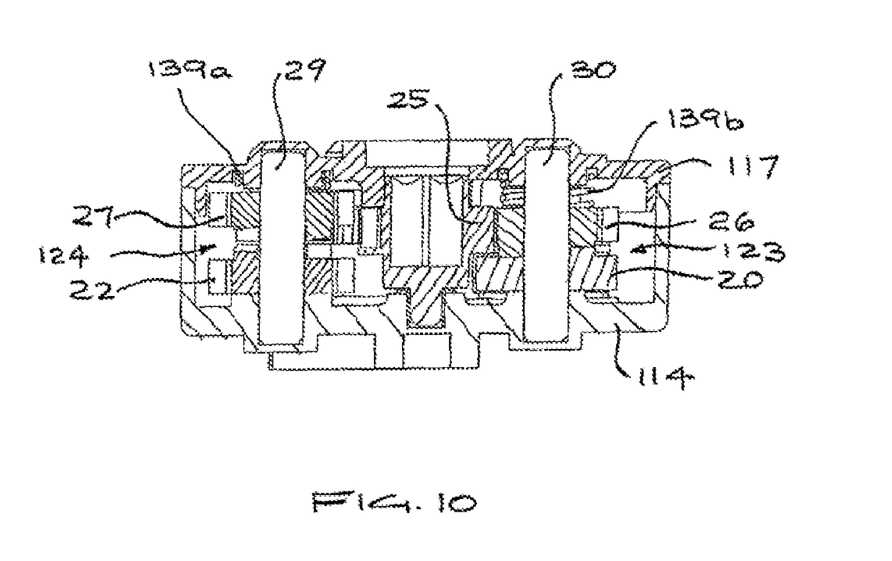
FIG. 10 is a schematic section along DD of FIG. 9.

Clutch 123 includes a circumferentially spaced first set of teeth 135b integral with the third gear 20 for engagement with at least one latching member in the form of a latching tooth 137b integral with the fourth gear 26. The axial dimension of the fourth gear 26 is such that it can slide axially along shaft 30 while maintaining mesh with the first gear 25, between engagement of the latching tooth 137b with, and disengagement from, the teeth 135b depending upon its direction of rotation. A compression spring 139b extends between the closure 117 and the fourth gear 26. The teeth 135b and latching tooth 137b have complementary shapes and are tapered to provide, under the urging of compression spring 139b, engagement of the driven third gear 20 with the driving fourth gear 26 upon rotation in a first direction (as seen in FIG. 10) and overrunning in a direction opposing the first direction. Clutch 124 is of like construction and FIG. 10 illustrates clutch 124 disengaged, with spring 139a compressed and gear 27 retracted.

Figure 7:
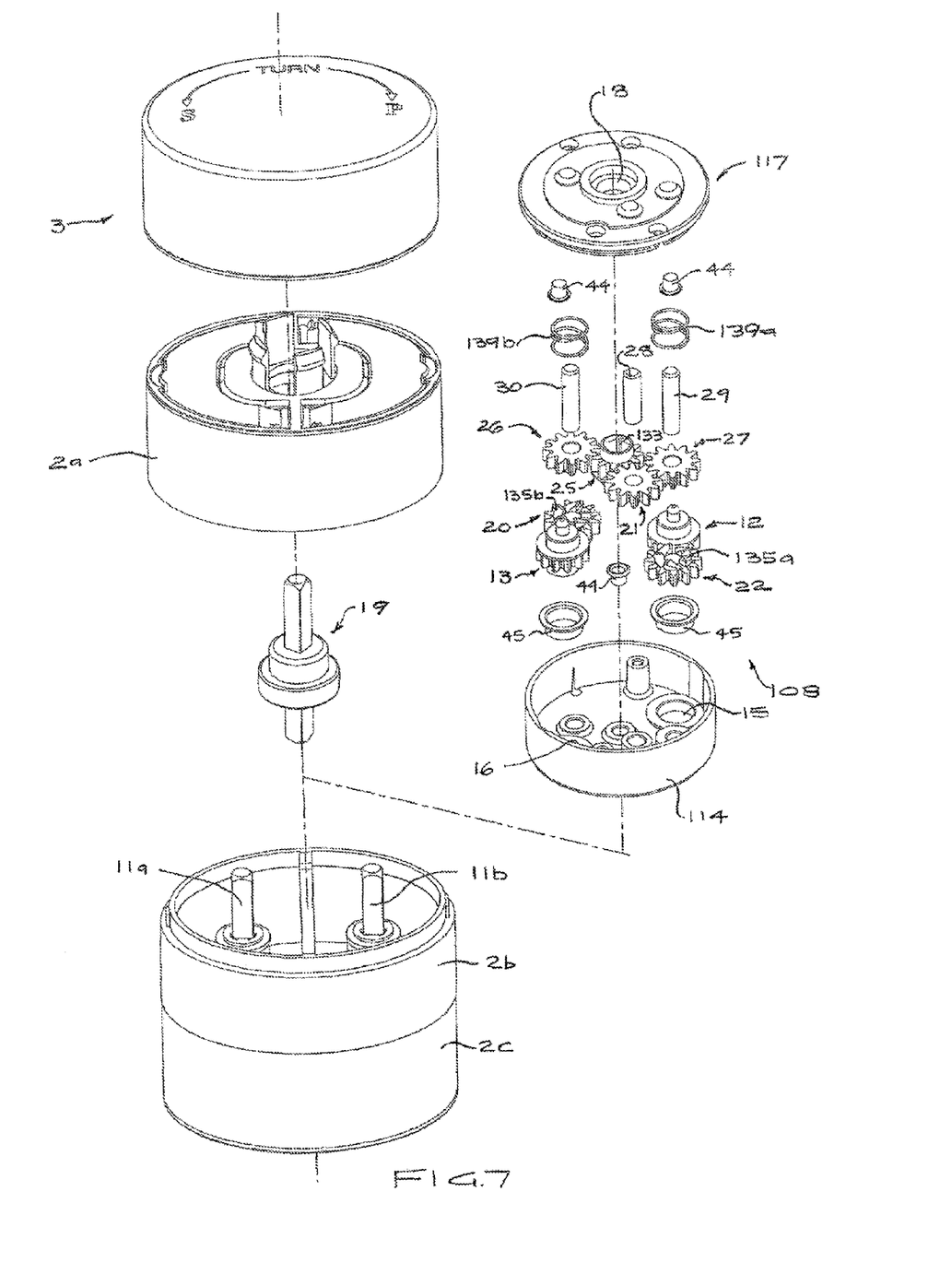
FIG. 7 is an exploded pictorial view of the gear drive assembly of a second embodiment of the invention.
Figure 8:
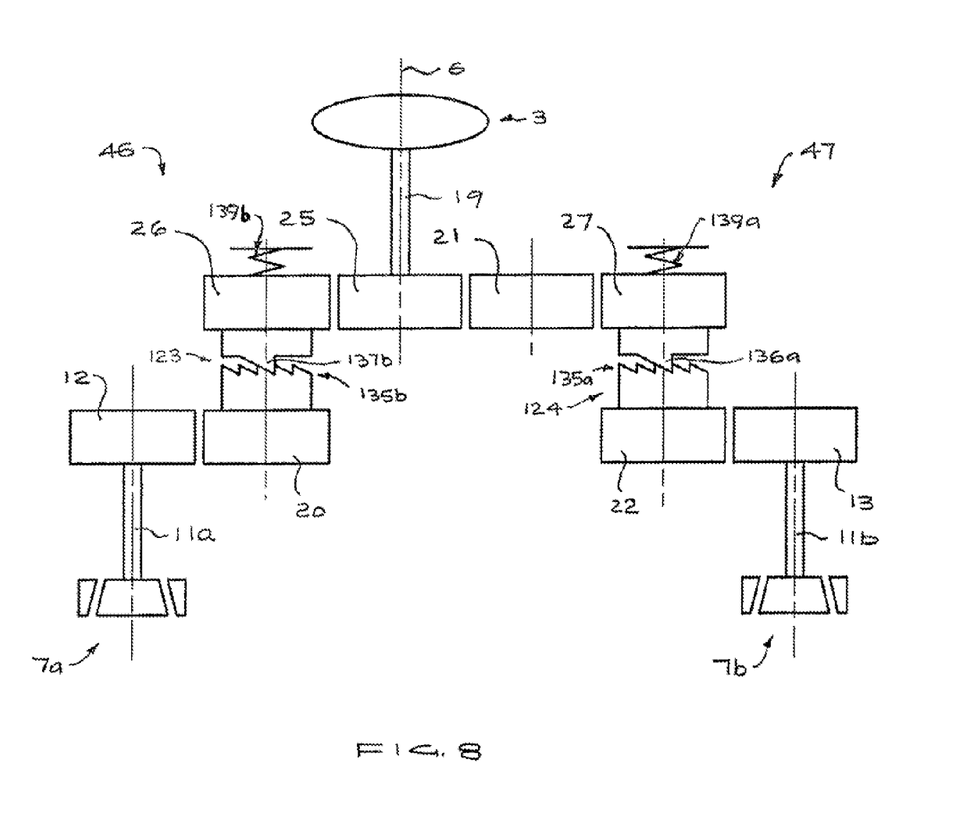
FIG. 8 is a schematic illustration of drive assembly of the grinder of FIG. 7.

In the second embodiment the second gear train 47 also serves to transmit torque from the first gear 25 to the shaft 11b. However, rather than as provided in the first embodiment (where the sixth gear 27 is meshed with the first gear 25, and the eighth gear 21 is meshed with both the fifth 13 and seventh gears 22), in the second embodiment the eighth gear 21 is instead meshed with both the first and sixth gears 25, 27, and the seventh gear 22 is meshed with the fifth gear 13.

Figure 9:
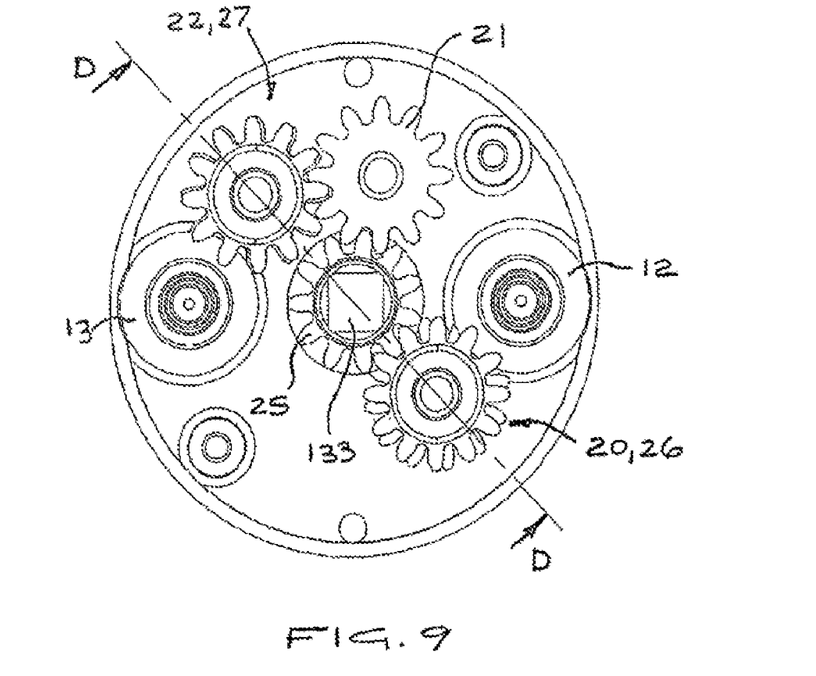
FIG. 9 is a plan view of the gear drive assembly of FIG. 7.
Figure 11:
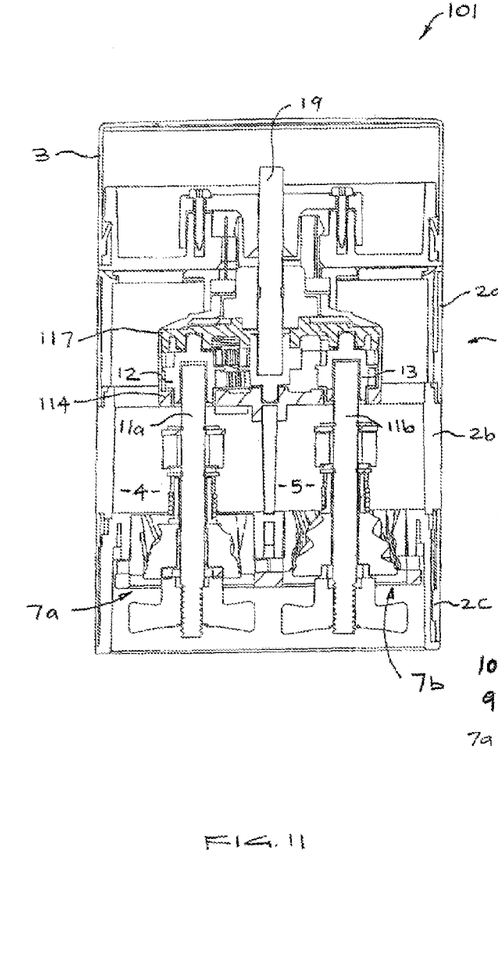
FIG. 11 is a schematic longitudinal section of the grinder of FIG. 7.

The drive assembly 108 is also held in an axially-aligned cylindrical enclosure 114 disposed between housing parts 2a and 2b. The closure 117 is disc-shaped covers the open end of the enclosure 114 and has a central opening 18 for receiving a drive shaft 19 coaxial with the axis 6 and drivingly fixed to the handle 3. Apertures 15, 16 in the base of enclosure 114 are provided for receiving the shafts 11a, 11b. The ends of shafts 29, 30 are mounted in journals 44 in the closure 117, and the first gear 25 is mounted in a journal 44 in the enclosure 114. The second and fifth gears 12, 13 are mounted in journals 45 in the enclosure 114.

Figure 12:
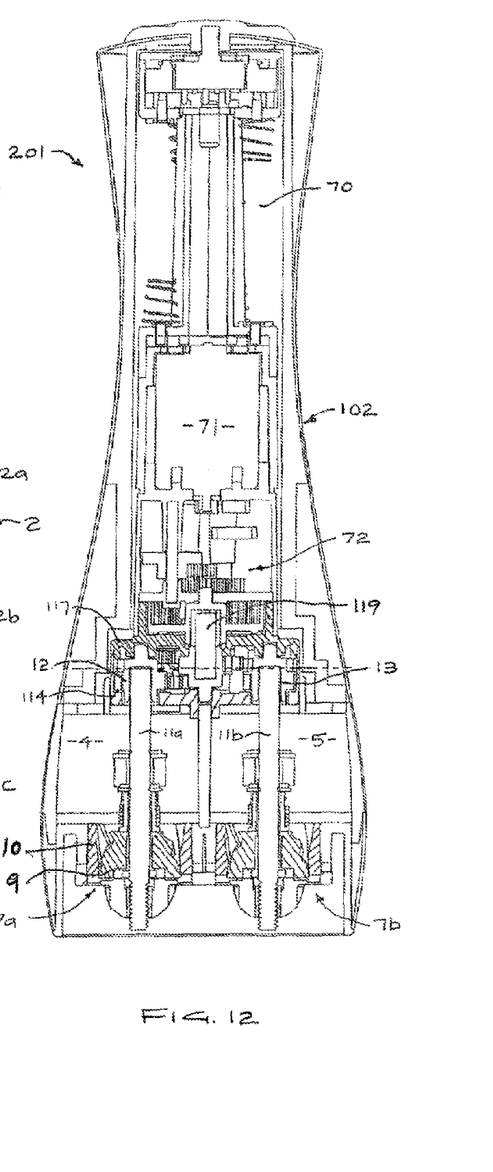
FIG. 12 is a schematic longitudinal section of a third embodiment of a dual condiment grinder of the invention.

FIG. 12 illustrates a third embodiment of the invention, wherein the drive assembly 108 of the second embodiment is incorporated in a cordless electric dual condiment grinder 201, wherein the rotary input is provided in the form of a reversible electric motor 71.

The grinder 201 includes a housing 102 having a generally circular cross section of a waisted form, having broader dimensions near its base and top. A battery compartment 70 is provided at the top of the housing above the electric motor 71 connected through speed-reducing geartrain 72 to the drive shaft 119. The shaft 119 has a square section end drivingly received in the square-sided aperture 133 in the first gear 25. The housing assembly 102 encloses adjacent condiment-receiving compartments 4 and 5 through which the grinder shafts 11a, 11b that extend. Respective grinding mechanisms 7a, 7b are installed at the bottom of each compartment 4, 5, each with generally axially-aligned inner and outer grinding elements 9, 10. The inner grinding element 9 is mounted at the lower end of the grinder shafts 11a, 11b. Each of the outer grinding elements 10 is fixed in the lower end of housing assembly 2, to extend about a respective inner element 9.

In both of the embodiments of the drive assembly 8, 108 the eighth gear 21 acts as an auxiliary gear to provide a reversing action allowing both grinding mechanisms 7a, 7b to be rotated in the same sense. In both grinding mechanisms 7a, 7b therefore, common grinding elements 9, 10 are used; the outer grinding elements 10 having teeth 42 aligned axially and having a directionally arranged form, while the inner grinding elements 9 have teeth 43 of a right-handed helical form.

The design also allows relatively small diameter gears to be used so that the first and second gear trains may be held within a body with a relatively small lateral dimensions. It also allows the shafts 11a, 11b to be relatively widely separated, still providing reservoirs of satisfactory lateral dimensions.

Aspects of the present invention have been described by way of example only and it should be appreciated that modifications and additions may be made thereto without departing from the scope thereof.

The invention claimed is:

1. A dual condiment grinder comprising:
first and second compartments for containing a separate condiment to be ground, each compartment having a top and bottom end,
a first and second grinding mechanism, each installed at the bottom of a respective one of the compartments,
first and second shafts having bottom ends fixedly attached to each of the grinding mechanisms and top ends respectively extending upwardly through their associated compartments,
a rotary input mounted for bidirectional rotation about a driving axis for selective rotation of one of the first and second grinding mechanisms,
first and second gear trains for transmitting torque from the rotary input to the first and second shafts respectively,
first and second one-way clutches, each provided in a respective one of the gear trains, whereby rotation of the rotary input in one direction rotates the first grinding mechanism, while the second grinding mechanism is stationary, and rotation of the rotary input in a direction opposite to the one direction rotates the second grinding mechanism, while the first grinding mechanism is stationary, both grinding mechanisms rotating in the same sense; and
a first gear driven by the rotary input, the first gear train comprising second, third and fourth gears and the second gear train comprising fifth, sixth, seventh and eighth gears, wherein:
the second gear is rotationally fast with the first shaft,
the third gear is meshed with the second gear,
the fourth gear is meshed with the first gear and mounted coaxially with the third gear,
the fifth gear is rotationally fast with the second shaft,
the sixth and seventh gears are mounted coaxially,
the first one-way clutch transmits torque unidirectionally between a first pair of gears comprising the fourth and third gears and the second one-way clutch transmits torque unidirectionally between a second pair of gears comprising the sixth and seventh gears and either:
the sixth gear is meshed with the first gear, and the eighth gear is meshes with both the fifth and seventh gears, or
the eighth gear is meshed with both the first and sixth gears, and the seventh gear is meshed with the fifth gear.

2. The grinder of claim 1 wherein the first, second, third, fifth, sixth, and eighth gears are mounted for rotation about substantially parallel axes.

3. The grinder of claim 1 wherein the gears are bevel gears and the rotary input comprises a manually-rotated handle or a drive shaft of a reversible motor.

4. The grinder of claim 1 wherein each one-way clutch includes first and second members for transmitting torque therebetween, the first member having one of circumferentially spaced teeth and a latching member mounted to engage the teeth and the second member includes the other of circumferentially spaced teeth and a latching member mounted to engage the teeth, and each one-way clutch further includes a spring for urging the latching member into engagement with the teeth.

5. The grinder of claim 4 wherein the circumferentially spaced teeth of each clutch are integral with a first of the gears of each gear pair and a second of the gears of each gear pair includes an axially-extending recess, the latching member and spring are received in the recess such that the latching member is axially moveable, but rotationally fast with the recess and the spring acts urges the latching member to engage the teeth.

6. The grinder of claim 4 wherein the circumferentially spaced teeth of each clutch are integral with a first of the gears of each gear pair and a second of the gears of each gear pair is integral with the latching member and mounted to slide axially on a shaft, and the spring acts upon the second of the gears to urge the latching member to engage the teeth.

* * * * *